United States Patent [19]

Collins et al.

[11] Patent Number: 4,598,290
[45] Date of Patent: Jul. 1, 1986

[54] FIBER OPTIC PENETRATOR FOR OFFSHORE OIL WELL EXPLORATION AND PRODUCTION

[75] Inventors: Jerry C. Collins, Allen; Charles P. Warner; Jerry A. Henkener, both of San Antonio; Rolf Glauser, Helotes, all of Tex.

[73] Assignee: Mobil Oil Corporation, New York, N.Y.

[21] Appl. No.: 604,695

[22] Filed: Apr. 27, 1984

Related U.S. Application Data

[63] Continuation-in-part of Ser. No. 508,799, Jun. 29, 1983.

[51] Int. Cl.$^4$ .................. H04B 13/02; B23Q 5/00; G02B 6/36
[52] U.S. Cl. .................. 340/850; 174/11 R; 174/70 S; 350/96.2
[58] Field of Search .............. 174/11 R, 70 R, 70 S; 350/96.20, 96.21, 96.22; 339/117 R, 74 R, 252 R; 340/850

[56] References Cited

U.S. PATENT DOCUMENTS

| | | | |
|---|---|---|---|
| 3,520,985 | 7/1970 | Jarvis | 174/70 S X |
| 3,825,320 | 7/1974 | Redfern | 350/96.22 |
| 3,839,608 | 10/1974 | DeVries | 339/117 R X |
| 3,882,263 | 5/1975 | Korner et al. | 174/11 R |
| 3,897,028 | 7/1975 | Doellner | 244/3.1 |
| 3,951,515 | 4/1976 | Allard | 350/96.22 |
| 4,029,894 | 6/1977 | Jarvis et al. | 174/70 S |
| 4,172,212 | 10/1979 | Heinzer | 174/70 S |
| 4,214,809 | 7/1980 | Reh | 350/96.2 |
| 4,217,028 | 8/1980 | Reh et al. | 174/70 S |
| 4,295,701 | 10/1981 | Gunn | 339/117 R |
| 4,299,431 | 11/1981 | Wilson et al. | 339/117 R |
| 4,423,924 | 1/1984 | Braun | 350/96.2 X |
| 4,432,604 | 2/1984 | Schwab | 350/96.2 X |
| 4,469,399 | 9/1984 | Cowen et al. | 350/96.2 |
| 4,505,540 | 3/1985 | Furusawa | 350/96.21 X |

*Primary Examiner*—Charles T. Jordan
*Assistant Examiner*—Brian S. Steinberger
*Attorney, Agent, or Firm*—A. J. McKillop; Michael G. Gilman; George W. Hager, Jr.

[57] ABSTRACT

A fiber optic bulkhead penetrator for allowing fiber optic communication lines to penetrate through an undersea bulkhead employed in offshore oil well exploration and production apparatus having a very high pressure differential thereacross. The arrangement consists of a port and cofferdam installed in the undersea oil well exploration and production apparatus, and a bullnose penetrator, having a plurality of bulkheads therein, terminating an undersea fiber optic cable used for data transmission. The bullnose penetrator serves as a mating plug for a port provided in the oil well apparatus, with three sets of seals isolating the single-atmosphere environment from the ambient seawater pressure. A shoulder is provided on the penetrator and in the port to hold the penetrator in place once the cofferdam is evacuated and lowered to habitat pressure.

12 Claims, 8 Drawing Figures

FIBER OPTIC PENETRATOR FOR OFFSHORE OIL WELL EXPLORATION AND PRODUCTION

CROSS-REFERENCE TO RELATED PATENT APPLICATIONS

This application is a continuation-in-part patent application of copending U.S. Ser. No. 508,799, filed June 29, 1983.

BACKGROUND OF THE INVENTION

1. Field of the Invention

The present invention relates generally to a fiber optic penetrator for allowing fiber optic communication lines to penetrate through the wall of an undersea apparatus employed in the exploration and production of offshore oil wells, and which is subjected to a very high pressure differential thereacross.

2. Discussion of the Prior Art

The state of the art discloses several different types of penetrators for effecting signal communications through a bulkhead or wall structure separating physical environments of significantly different pressure, and more particularly, penetrators for conveying optical fibers of fiber optic communication systems therethrough. Redfern U.S. Pat. No. 3,825,320, Allard U.S. Pat. No. 3,951,515, Heinzer U.S. Pat. No. 4,172,212 and Reh U.S. Pat. No. 4,214,809 all disclose various embodiments of penetrators. The term bulkhead is used generically herein to cover the wall or partition structures of undersea apparatus employed in offshore oil well exploration and production.

Fiber optic communication systems offer a number of distinct advantages in offshore environments, such as apparatus employed for oil well exploration and production, relative to traditional electrical cable communication systems. One problem with transmitting information through standard electrical cables is the undesirable effect of radiated and conducted electromagnetic interference normally associated with these cables. Such interference may, for example, cause spurious or other erroneous readings from equipment attached to the cable. The advantages to be gained by an optical communication system over the use of conventional wire cables include higher per channel data rate capability, immunity to electromagnetic interference, lower cable weight, elimination of fire hazard due to electrical shorting, and potentially lower cost. For some data link applications, multi-fiber bundles of medium and high loss fiber are utilized. Light emitting diodes (LEDs) are frequently employed as optical sources, and photodiodes are often used for optical detection.

In optic fiber communication systems, the requirements for a penetrator are, in some respects, more severe than for electric systems using metallic conductors and, in other respects, less severe, since the optic fibers are not subject to shorting by conductive sea water. Fiber optic penetrators preferably should not involve interruption of the light path by interface structures, since these are inevitably, at least somewhat, lossy.

SUMMARY OF THE INVENTION

Accordingly, it is a primary object of the present invention to provide a fiber optic penetrator for bulkheads or wall structures of undersea apparatus employed for offshore oil well exploration and production for allowing fiber optic communication lines to penetrate through a bulkhead or wall structure having a very high pressure differential thereacross.

A further object of the subject invention is the provision of a fiber optic bulkhead penetrator of the aforementioned type which is designed for at operating depths up to 2500 feet or more. The present invention is particularly designed to enable the use of fiber optic communications and data transmission between undersea apparatus and between such apparatus and surface facilities.

In accordance with the teachings herein, the present invention concerns a fiber optic cable termination and bulkhead penetrator employed in offshore oil well exploration and production. The system consists of a port and cofferdam installed in an offshore apparatus, and of a bullnose penetrator terminating a fiber optic cable used for data transmission. The bullnose penetrator serves as a mating plug for a port provided in the offshore oil well exploration and production apparatus, with three sets of seals isolating the single-atmosphere environment from the ambient seawater pressure. As the penetrator is installed into the port, an equalizing port in the cofferdam prevents excessive pressure resistance to insertion. A shoulder is provided on the penetrator and in the port to hold the penetrator in place once the cofferdam is evacuated and lowered in pressure. One set of external seals, installed on the penetrator during assembly, prevents seawater entry into the cofferdam once the penetrator is properly seated in the port. When the cofferdam is opened to the single-atmosphere environment, a second set of internal seals is installed. The third seal is a pressure responsive seal which is selectively activated by introducing hydraulic pressure therein to compress the seal around the penetrator. A locking mechanism also incorporated into the design includes a hinged split ring which serves as a carriage for set screws which are used to provide initial compression for the set of internal seals.

Three optical fiber bulkheads are provided in the bullnose penetrator. A first external bulkhead is designed as a hermetic termination for an optical fiber transmission cable containing a metal tube encasing the cable core of optical fibers. A flexible coupling to the tube is designed to accommodate anticipated differential thermal expansion of the various cable elements during initial thermal shock upon deployment thereof. This external bulkhead seats in a breakaway flange, and if the cable is snagged or pulled, the flange is designed to break away before the penetrator is pulled from the port. A cage and a spring are attached to this flange which ensure that the second bulkhead maintains its seal during normal handling and during normal operation such that the second bulkhead is properly positioned in the event of severing of the breakaway flange. The third bulkhead serves as a penetrator of the cofferdam bulkhead once the system is installed. The bullnose penetrator body is extended to provide space for coiling of the optical fibers which are protected with a length of tubing attached to the second and third bulkheads. Inside the nose of the penetrator, space is allowed for coiled fiber pigtails to be terminated conventionally inside the single atmosphere environment.

BRIEF DESCRIPTION OF THE DRAWINGS

The foregoing objects and advantages of the present invention for a fiber optic penetrator employed in offshore oil well exploration and production apparatus may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

Figure 2A:
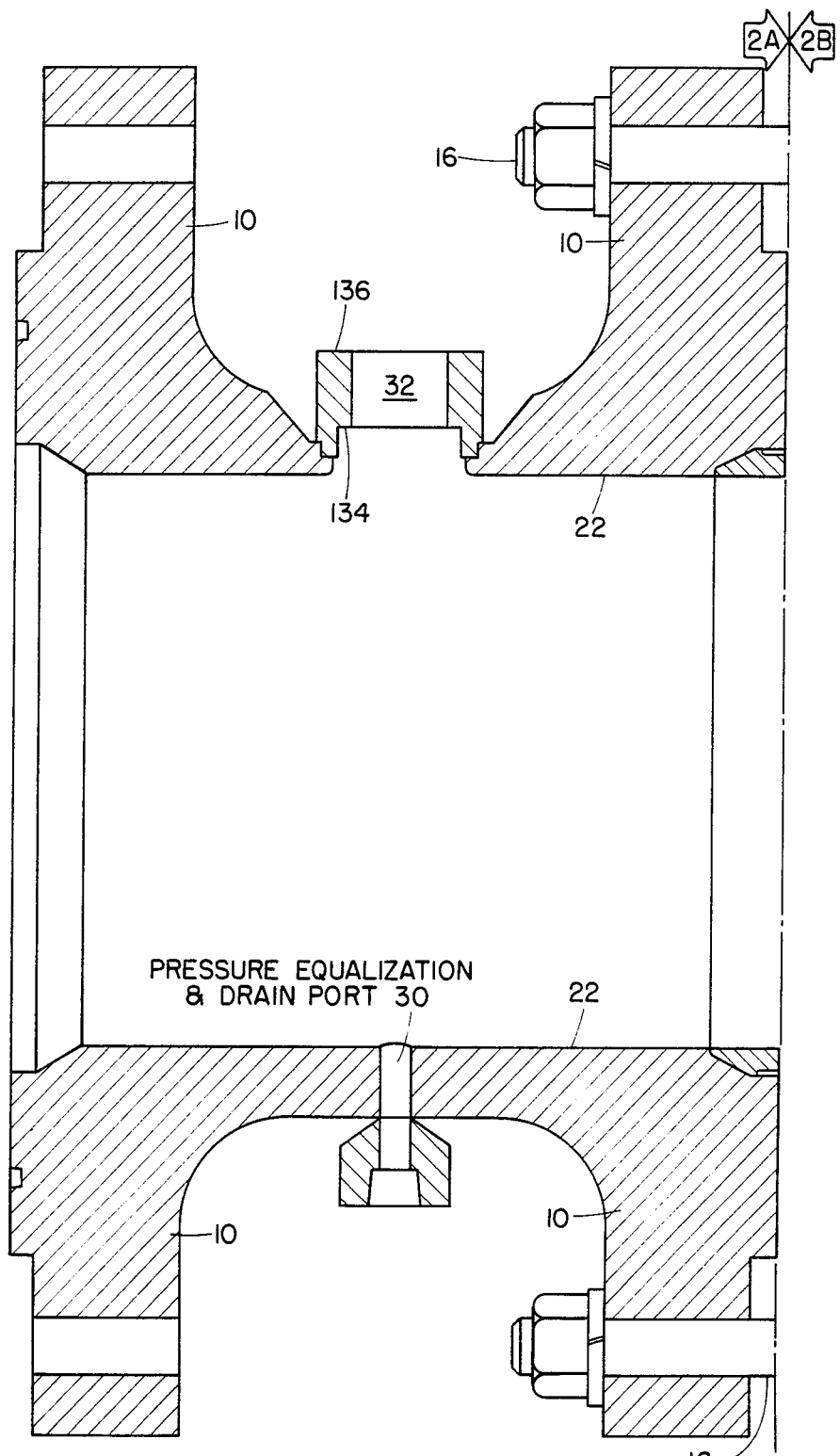
FIGS. 2A and 2B are elevational sectional views, broken as indicated by arrows 2A, 2B, of an exemplary embodiment of a cofferdam and associated offshore oil well bulkhead, with the cofferdam being designed to receive the bulkhead penetrator of FIGS. 1A and 1B.
Figure 2B:
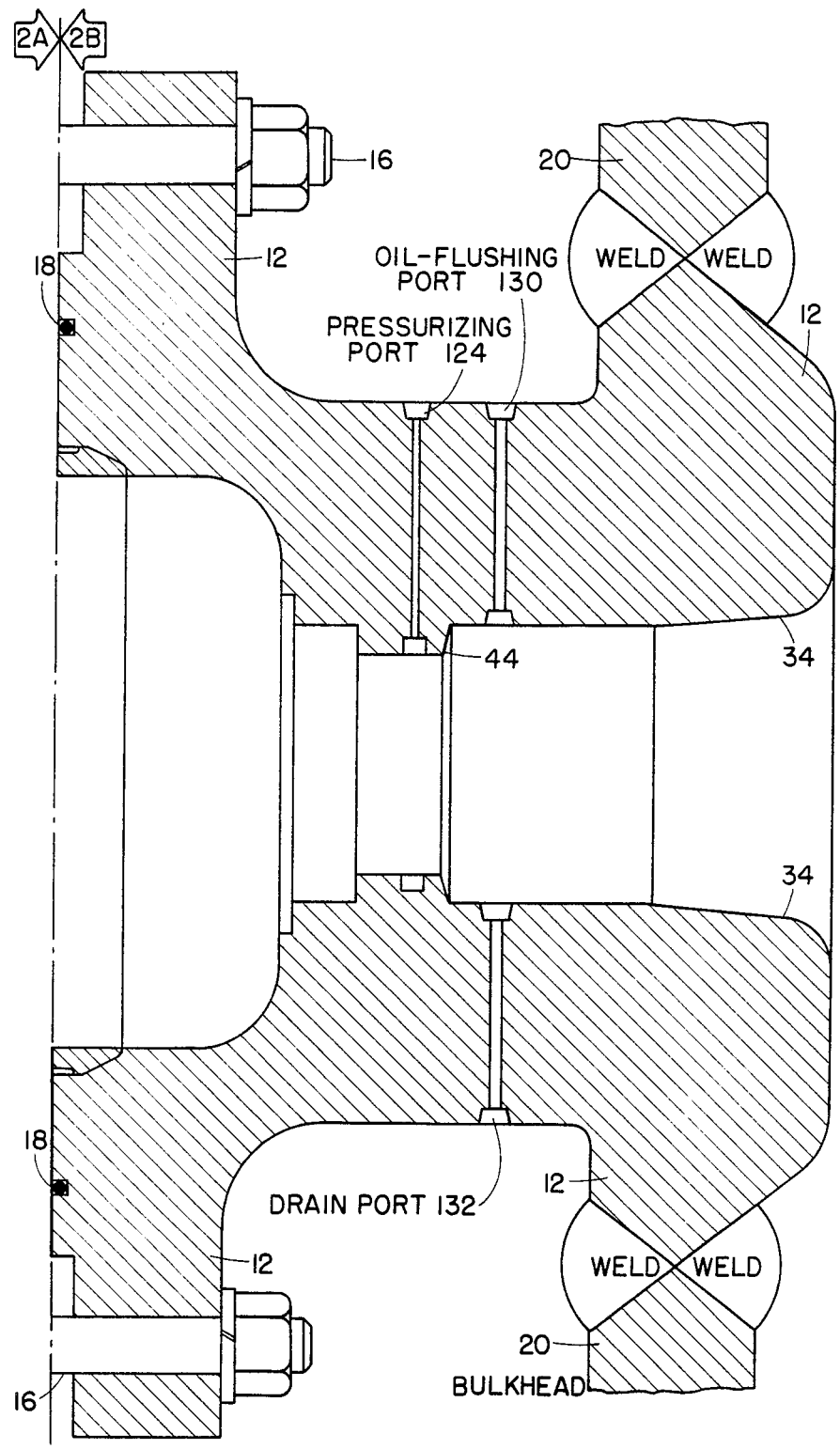

Referring to the drawings in detail, particularly FIGS. 2A and 2B, a first spool piece 10, having a circular configuration as seen from views to the left or right of that shown, is designed to mount onto an undersea apparatus for offshore oil well exploration and production defining an undersea environment normally positioned to the left of the first spool piece 10. A second spool piece 12, also having a circular configuration as seen from views to the left or right of that shown, is bolted to the first spool piece 10 by a plurality of bolts 16 and is sealed relative thereto by an O ring 18. An outer annular bulkhead wall 20 has a circular aperture therein to receive the right circular end of the second spool piece 12, and the two components are then normally welded together by a full penetration weld along the open Vs to the left and right of the circular aperture and right circular end of spool piece 12.

Figure 4:
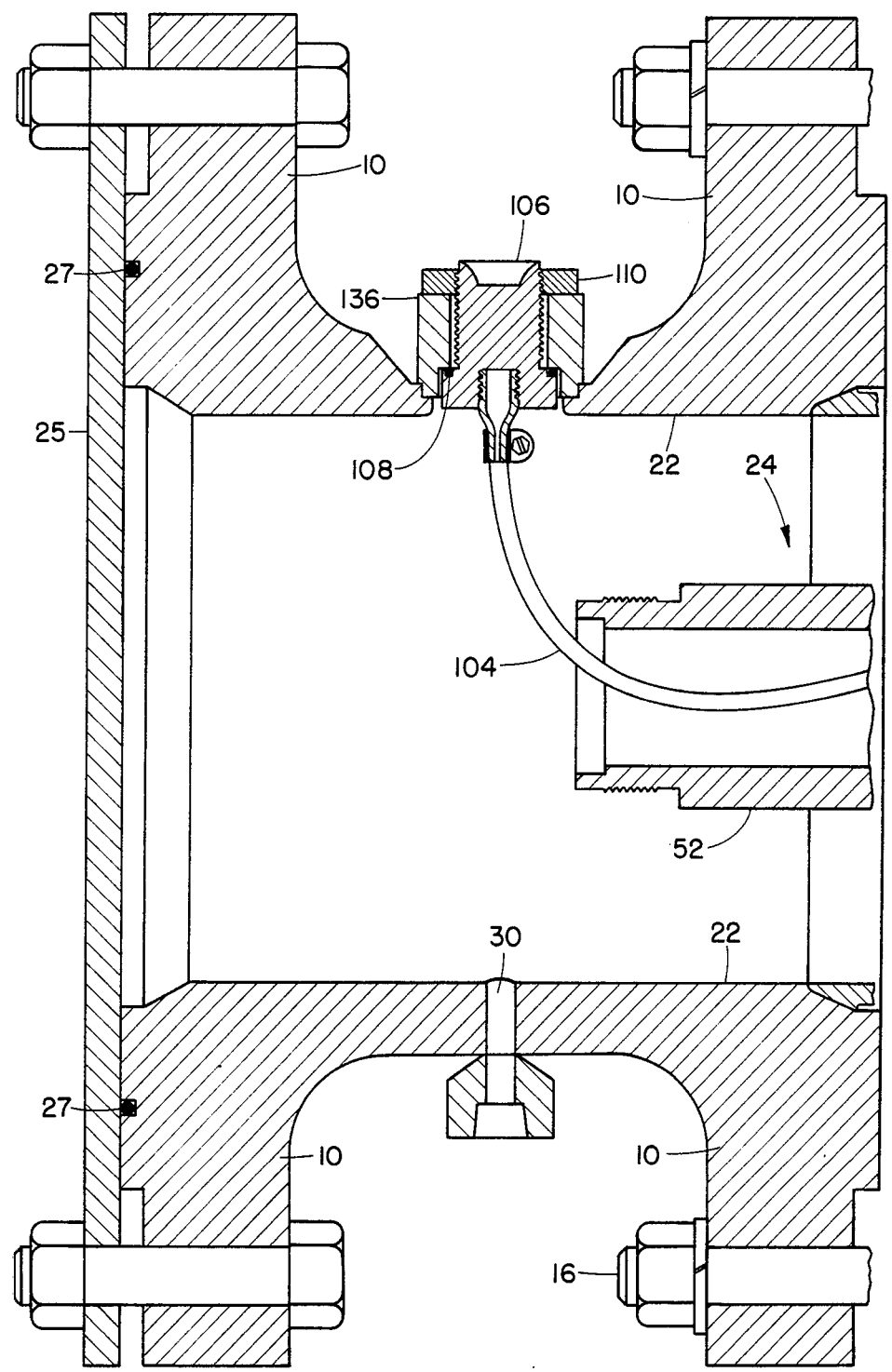
FIG. 4 is a view similar to FIG. 3A, but illustrating the internal structure of the bulkhead penetrator, with the penetrator bulkhead removed and positioned in its port through the cofferdam.

The first and second spool pieces 10 and 12 define a cofferdam having a generally cylindrical interior space 22, into which a bullnose bulkhead penetrator 24 is designed to be mounted, as explained in greater detail hereinbelow. The cofferdam generally provides a watertight enclosure to provide access to the surrounding undersea environment, with access to the cofferdam being provided through the circular aperture in the left end of the first spool piece 10. A cover plate 25, is sealingly mounted by O ring 27 over the left circular aperture, in a manner as shown in FIG. 4, to seal the cofferdam from the undersea environment until access thereto is required. A pressure equalization and drain port 30 in the cofferdam is provided to prevent excessive pressure resistance to the initial insertion of the bullnose penetrator 24 into the cofferdam. A fiber optic plug penetrator port 32 is also provided in the cofferdam for reasons explained in greater detail hereinbelow.

Figure 1A:
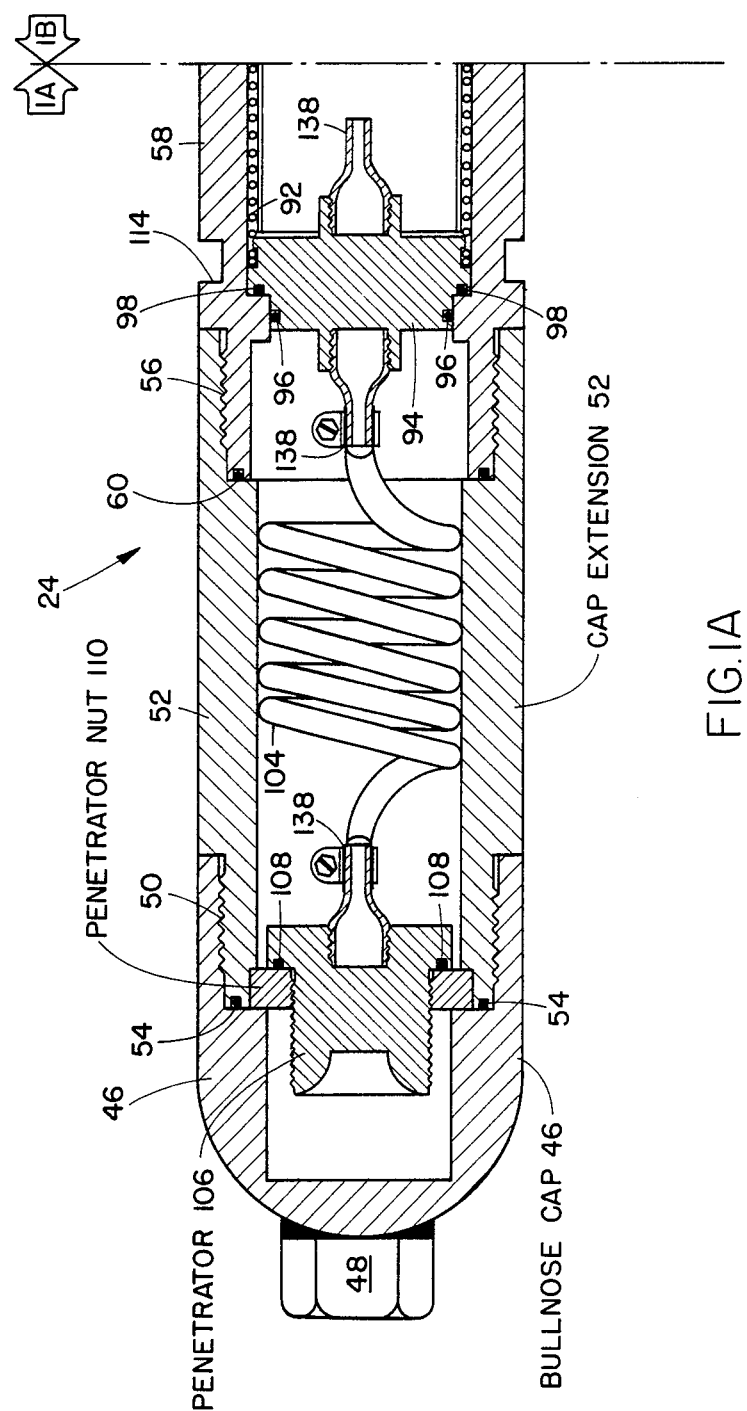
FIGS. 1A and 1B are elevational sectional views, broken as indicated by arrows 1A, 1B, of an exemplary embodiment of a bulkhead penetrator for an offshore oil well apparatus constructed pursuant to the teachings of the present invention.
Figure 1B:
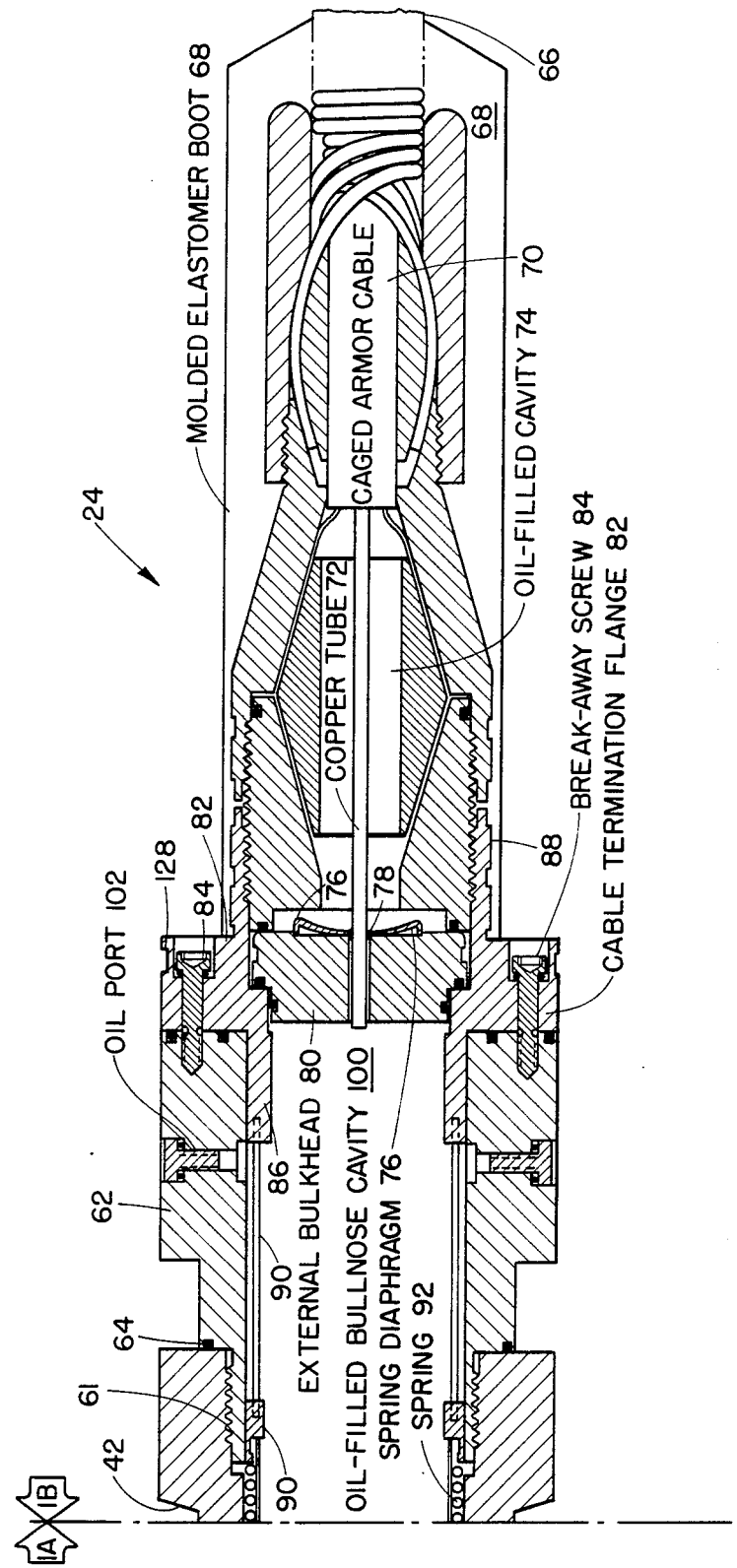
Figure 3A:
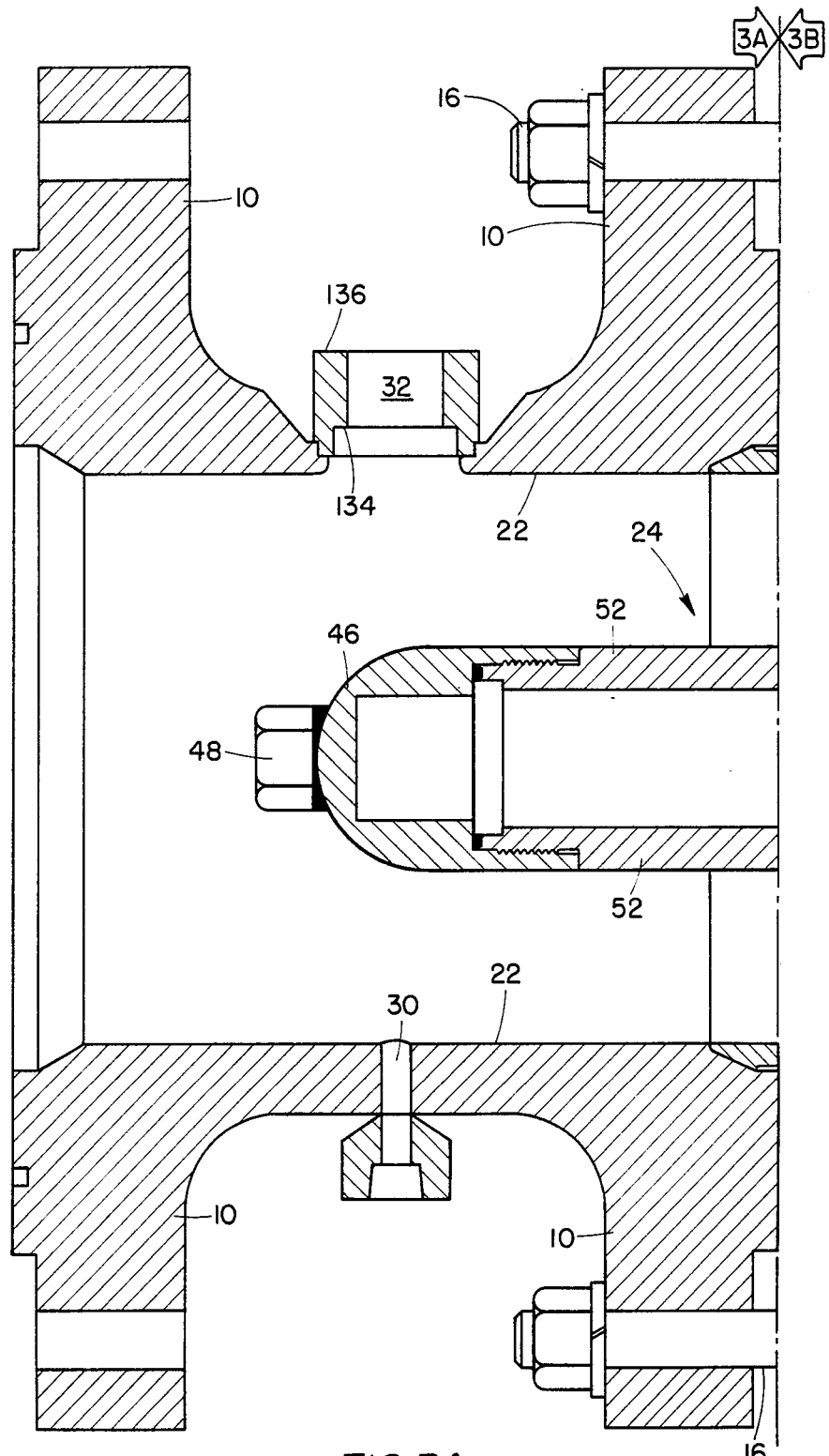
FIGS. 3A, 3B and 3C are elevational sectional views, broken as indicated by arrows 3A, 3B, 3C, of the bulkhead penetrator of FIGS. 1A and 1B (without the internal structure being shown) positioned and seated in the cofferdam of FIGS. 2A and 2B.
Figure 3B:
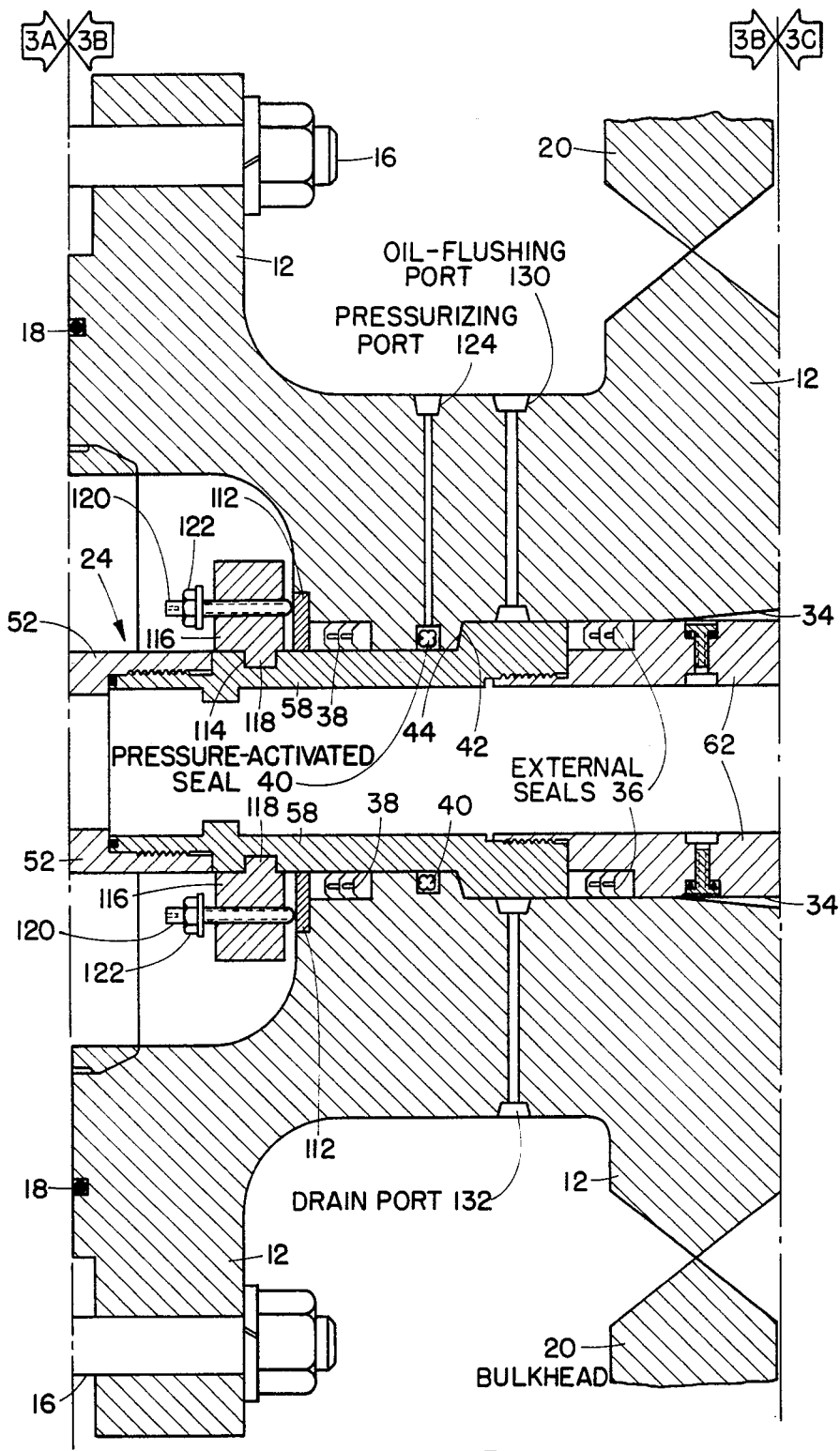
Figure 3C:
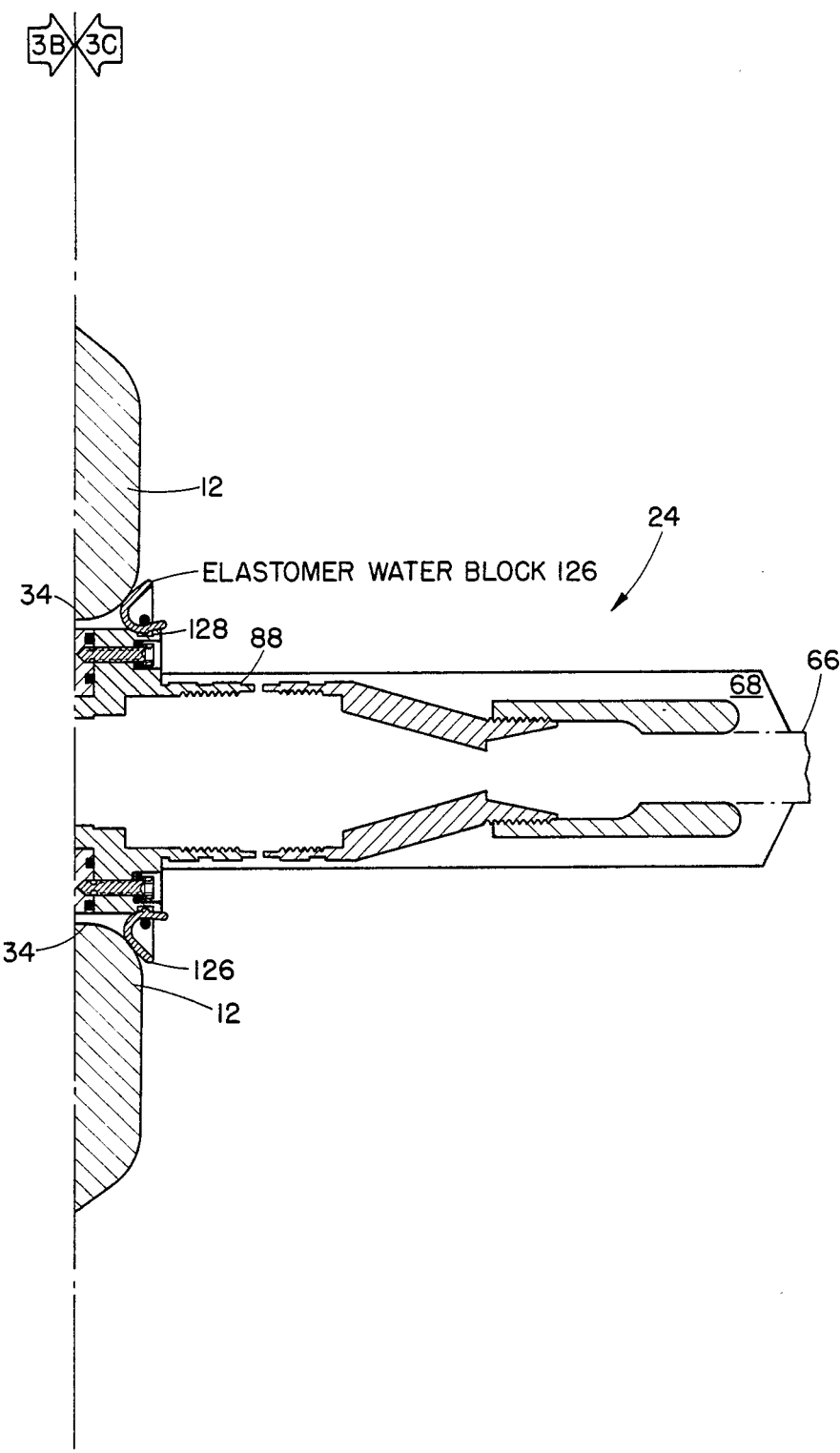

The bullnose penetrator 16, shown in FIGS. 1A and 1B, is inserted and seats into a corresponding, generally circular entrance port 34 in the cofferdam, as illustrated in FIG. 3, and is sealed relative thereto by an external set of seals 36, an internal set of seals 38 and a pressure responsive seal 40. A shoulder 42 and a corresponding mating shoulder 44 are provided respectively on the bullnose penetrator and in the cofferdam entrance port 34 to hold the penetrator in place once the cofferdam is evacuated and lowered in pressure. The arrangement is designed for remote installation of the bulkhead penetrator to operating depths of up to 2500 feet of seawater, which is quite common relative to the working depths of offshore oil well exploration and production rigs.

The external body of the bullnose penetrator is constructed by a number of interconnected sections including a bullnose cap 46 having a lug 48 welded thereto to allow the cap to threadedly engage, by corresponding threads 50, a first cylindrical body section 52, with the engaged pieces being sealed by an O ring 54. The first cylindrical section 52, at its opposite end, threadedly engages, by corresponding threads 56, a second cylindrical body section 58, with the engaged pieces being sealed by an 0 ring 60. The second cylindrical body section 58, at its opposite end, threadedly engages, by corresponding threads 61, a third cylindrical body section 62, with the engaged pieces being sealed by an 0 ring 64.

A fiber optic cable 66 provides fiber optic data communication and transmission, through the bulkhead penetrator, between the undersea oil well exploration and production apparatus and surface facilities, or between various of such oil well undersea apparatus. The fiber optic cable 66, which is designed for operation in the undersea environment, enters a molded elastomer boot 68 which houses a caged armor cable 70. The arrangement of the caged armor cable and its termination in the elastomer boot is somewhat conventional in nature. The fiber optic strands, which typically number from 6 to 8, are housed in a centrally disposed copper tube 72 which traverses through an oil-filled cavity 74 in the elastomer boot to a flexible coupling in the form of a spring diaphragm 76 soldered at 78 to the end of the copper tube. The soldered connection is designed to provide a hermetic seal, while the flexible coupling is designed to accommodate anticipated differential thermal expansion of the various cable elements during the thermal transients encountered during deployment of the bulkhead penetrator. The oil-filled cavity 74 is filled with an inert oil, such as a silicon based oil, to provide a flexible chamber which resists the entry of seawater therein.

The individual optical fibers then proceed through individually sealed, longitudinally disposed openings in a first, external bulkhead 80 in the bulkhead penetrator. The external bulkhead 80 is seated in a breakaway cable termination flange 82 to provide a safety feature in the event the transmission cable is snagged or pulled, such that the flange is designed to break away before the bullnose penetrator is pulled from its entrance port. The external bulkhead 80 is secured to the housing of the bullnose penetrator by breakaway bolts or screws 84 to allow the release of the external bulkhead. An inwardly extending cylindrical portion 86 provides anti-torque resistance to the breakaway flange, and in the event of snagging or extreme pulling on the cable 66, the cylindrical section 86 might be pulled out with the remainder of the flange or might sever at its joinder to the main body of the flange. An outwardly extending generally cylindrical portion 88 of the breakaway flange has an irregular exterior surface over which the molded elastomer boot 68 fits for secure fastening and gripping thereof.

A cage 90 and a compression spring 92 are attached to the breakaway flange 82, with the spring 92 bearing against a second bulkhead 94 to ensure that in normal operation it maintains the integrity of its seal provided by O ring seals 96 and 98. The arrangement of cage 90 and spring 92 allows the bulkhead penetrator to be assembled with less precise tolerances, as the compression spring will ensure a proper compressive force against the second bulkhead 94 irrespective of the exact positioning of the various penetrator components. After the flange 82 breaks away, the ambient water pressure will continue to hold the second bulkhead in place, now as the primary bulkhead.

The optical fibers, after passing through the external bulkhead 80, traverse an oil-filled cavity 100 to the second bulkhead 94. The cavity 100 can be filled through a port 102 with an inert oil, such as a silicon based oil, to protect the optical fibers and resist the entry of sea water therein. Moreover, after the bulkhead penetrator is in position and operable in service, the pressure of the oil in the chamber can be monitored for any leakage of the seals, which would result in the imposition of the ambient seawater pressure on the fluid in the cavity.

The optical fibers, after passing through the second bulkhead 94, transfer to a coiled length of tubing 104 inside the elongated cylindrical chamber defined internally of the first cylindrical body section 52, and then pass through a third bulkhead and penetrator 106 having an O ring 108 positioned against a penetrator nut 110. The optical fibers terminate in free fiber optic ends after passing through the third bulkhead, and are stored thereat during deployment of the bulkhead penetrator for connection to the fiber optic communication system in the undersea oil well exploration and production apparatus after completion of deployment.

As a more detailed explanation of the sealing arrangement of the present invention, the external set of seals 36 can be conventional Chevron type seals which are installed on the penetrator during assembly and prior to deployment thereof. Once the penetrator is properly positioned in the entrance cavity or port 34 with the shoulders 42 and 44 seated together, these seals prevent seawater entry into the cofferdam after it is evacuated and lowered in pressure.

After the cofferdam is opened to the single atmosphere environment, the internal set of seals 38, which can be standard Chevron type seals, are installed from inside the cofferdam by sliding them over the bullnose cap into their proper position. A bearing ring 112 is then positioned against the seals. The second cylindrical body has an annular groove 114 positioned slightly internally of the ring 112, and a hinged split ring 116 has a radially inwardly extending annular shoulder 118 which slips into the annular groove 114. The split ring 116 is then locked in place, and a plurality of circumferentially arranged set and locking screws 120 are then tightened against the bearing ring 112 to lock and properly compress the seals 38 in place, and are then locked in place by locking nuts 122.

The third pressure responsive seal 40 is normally not activated, but is activated as required. For instance, in the event of leakage through the external and internal sets of seals, the third seal 40 can be activated through a pressurizing port 124 to provide an interim seal while the internal seals are replaced to restore sealing integrity, after which the pressure seal 40 would again normally be deactivated.

An elastomer water block 126 is also provided seated in an annular groove 128 around the breakaway flange 82 to prevent the entry of seawater into the generally tapered outside entrance to the entrance port 34. After the bulkhead penetrator is in position and sealed, a neutral oil can be introduced under pressure through an oil flushing port 130 while an oil drain port 132 is closed, thus forcing the neutral oil to flow around the penetrator and into the tapered section of the entrance port until the portion thereof behind the water block 126 is completely filled with oil, with some of the oil being forced through the water block into the surrounding seawater. The oil will tend to stay in this cavity to prevent any marine growth therein to maintain the entrance port 34 clean and free of marine growth.

After the bulkhead penetrator is deployed and sealed as described hereinabove, the bullnose cap 46 is unscrewed and the third bulkhead 106 and the penetrator nut 110 are removed, as shown in FIG. 4. The third bulkhead 106 also serves as a cofferdam penetrator, and the coiled length of tubing 104 allows the penetrator 106 to be removed and screwed into penetrator port 32 in the cofferdam until O ring 108 bears against annular shoulder 134 of port 32, after which penetrator nut 110 is tightened onto the top of penetrator 106 against upper shoulder 136 of the penetrator port 32. The free ends of the optical fibers are then connected to the communication system in the undersea apparatus, thus completing installation of the bulkhead penetrator.

The disclosed embodiment was designed to allow each of the three bulkheads to be assembed individually and tested prior to connection of the optical fibers, as follows. Each bulkhead can comprise a metal or glass-filled, molded epoxy disk into which tapered holes are drilled. The individual optic fibers are then passed through the individual tapered holes and are potted into place. The taper of each hole aids in resisting the pressure differential across the bulkhead as well as in threading and inserting the fiber therethrough. A portion of the length of each fiber can be stripped to the cladding to provide a glass surface for secure bonding thereof. Fittings 138 can be selectively provided adjacent each side of the bulkheads to function as bend limiters.

Each bulkhead is normally assembled and tested prior to being coupled together in the bulkhead penetrator by the optical fibers extending therethrough, with the fusing of the individual ends of the optical fibers being by art recognized techniques.

While a preferred embodiment of the present invention for a subsea fiber optic bulkhead penetrator for offshore oil well exploration and production apparatus or rigs is described in detail herein, it should be apparent that the disclosure and teachings of the present invention will suggest many alternative penetrator designs to those skilled in the art.

What is claimed is:

1. A fiber optic penetrator arrangement for an undersea wall structure of offshore oil well production apparatus, comprising:
   a. a generally cylindrical housing;
   b. a cofferdam associated with the undersea production apparatus and defining a generally cylindrical entrance port into which the penetrator is designed to be inserted and mounted;
   c. a sealing means for sealing said penetrator relative to said entrance port after insertion of the penetrator therein;
   d. an external bulkhead, e. a second bulkhead positioned internally of said external bulkhead, f. a compression spring normally retaining said second bulkhead in a sealed position with said penetrator, said compression spring being compressed between said second bulkhead and said external bulkhead, g. a breakaway connection affixed to said external bulkhead for coupling an optical fiber transmission cable to said external bulkhead, such that if the transmission cable is snagged or pulled, the external bulkhead will sever along with the breakaway connection so that the penetrator is not pulled from the cofferdam entrance port, said second bulkhead being held in position by ambient water pressure to become the primary bulkhead after said external bulkhead is severed.

2. A penetrator arrangement as claimed in claim 1, said sealing means including a set of external seals, a set of internal seals, and a pressure activated seal positioned between said external and internal set of seals and which is activated by hydraulic pressure to provide an interim seal in response to leakage through either the internal or external set of seals.

3. A penetrator arrangement as claimed in claim 2, said set of external seals being installed on said penetrator prior to deployment thereof, and said set of internal seals being installed on said penetrator from within said cofferdam after the penetrator is positioned in said cofferdam entrance port and sealed by said set of external seals.

4. A penetrator arrangement as claimed in claim 3, said set of internal seals being held in place after installation by a split retainer ring which is secured about said penetrator in an annular groove therein after the penetrator is positioned in said cofferdam entrance port, and a plurality of set screws extending through said split retainer ring to compress said set of internal seals in place.

5. A penetrator arrangement as claimed in claim 1, said cylindrical entrance port including an outwardly tapered mouth, said sealing means including an elastomer water block seal positioned around said penetrator at the entrance to said tapered mouth, and an oil port for introducing oil under pressure into said tapered mouth for filling the open volume thereof with oil behind said elastomer water block seal.

6. A penetractor arrangement as claimed in claim 1, said cofferdam including a pressure equalization port to enable said penetractor to be inserted into said entrance port without excessive water backpressure resistance to insertion thereof.

7. A penetractor arrangement system as claimed in claim 1, said optical fiber transmission cable being coupled to said penetractor by a flexible diaphragm forming a hermetic seal for the end of the transmission cable while also accommodating differential thermal expansions of the cable components.

8. A fiber optic penetrator arrangement for an undersea wall structure employed in offshore oil well production apparatus, comprising:

a. a penetrator including a generally cylindrical housing;

b. a cofferdam associated with the subsea wall structure and defining a generally cylindrical entrance port into which the penetrator is designed to be inserted and mounted;

c. a sealing means, including a set of external seals, a set of internal seals, and a pressure-activated seal positioned between said external and internal set of seals, for sealing said penetractor relative to said entrance port after insertion of the penetrator therein; and d. an optical fiber transmission cable coupled to said penetrator.

9. A penetrator arrangement as claimed in claim 8, said pressure-activated seal positioned between said external and internal set of seals, being activated by hydraulic pressure to provide an interim seal in response to leakage through either the internal or external set of seals.

10. A penetrator arrangement as claimed in claim 8, said set of external seals being installed on said penetrator prior to deployment thereof, and said set of internal seals being installed on said penetrator from within said cofferdam after the penetrator is positioned in said cofferdam entrance port and sealed by said set of external seals.

11. A penetrator arrangement as claimed in claim 10, said set of internal seals being held in place after installation by a split retainer ring which is secured about said bulkhead penetrator in an annular groove therein after the penetrator is positioned in said cofferdam entrance port, and a plurality of set screws extending through said split retainer ring to compress said set of internal seals in place.

12. A penetrator arrangement as claimed in claim 8, said cylindrical entrance port including an outwardly tapered mouth, said sealing means including an elastomer water block seal positioned around said penetrator at the entrance to said tapered mouth, and an oil port for introducing oil under pressure into said tapered mouth for filling the open volume thereof with oil behind said elastomer water block seal.

* * * * *